W. J. SPENCER.
TIRE.
APPLICATION FILED APR. 27, 1914.
1,134,291.
Patented Apr. 6, 1915.
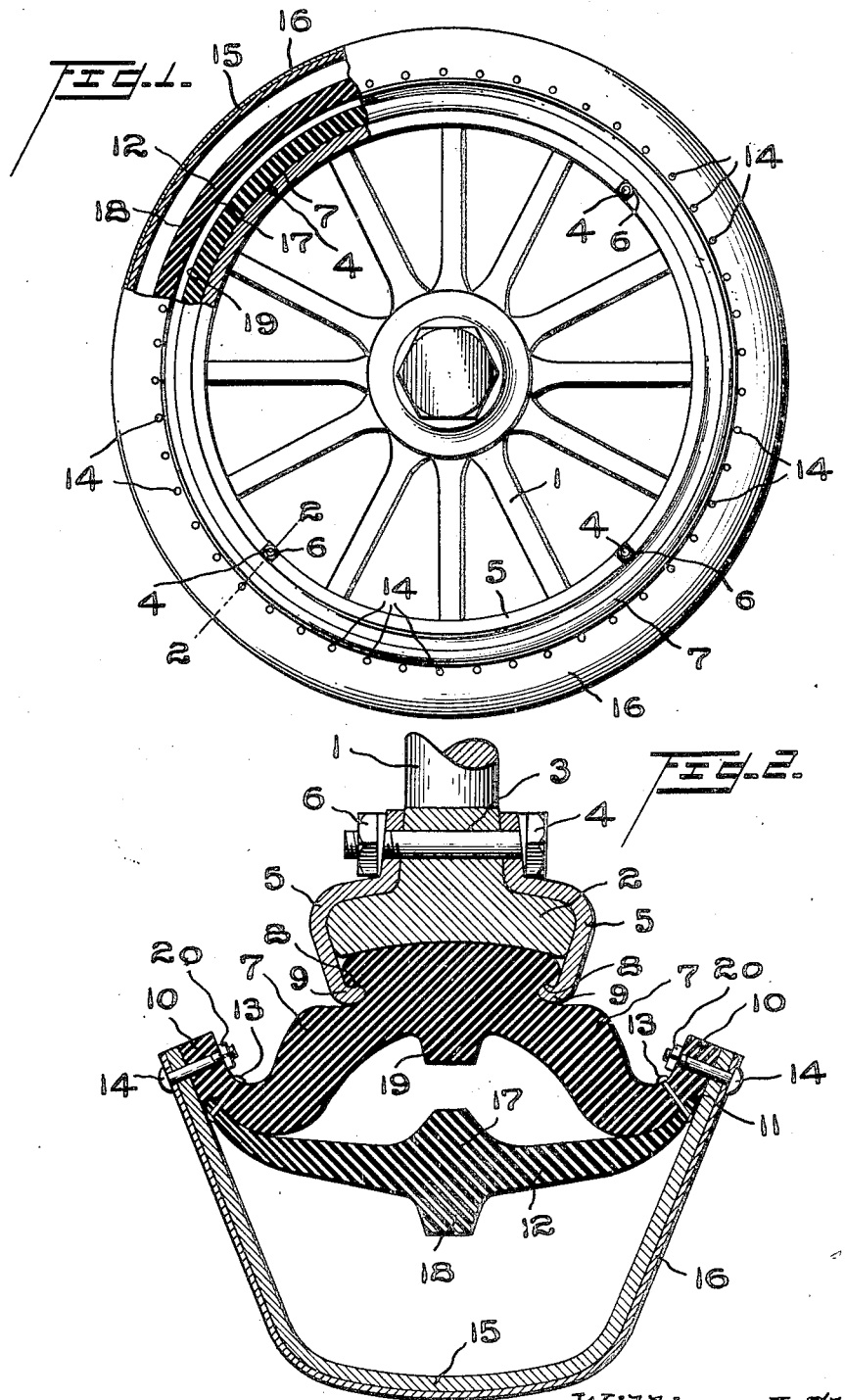
Witnesses
L. P. [illegible]
C. R. Ziegler.
Inventor
William J. Spencer
By Joshua R. H. Potts.
Attorney

UNITED STATES PATENT OFFICE.

WILLIAM J. SPENCER, OF NEW YORK, N. Y.

TIRE.

1,134,291.

Specification of Letters Patent.

Patented Apr. 6, 1915.

Application filed April 27, 1914. Serial No. 834,711.

*To all whom it may concern:*

Be it known that I, WILLIAM J. SPENCER, a citizen of the United States, residing at New York, in the county of New York and State of New York, have invented certain new and useful Improvements in Tires, of which the following is a specification.

My invention relates to improvements in tires, and more particularly to an improved shock absorbing, resilient, non-pneumatic vehicle tire adapted for use on automobiles, motor cycles, and vehicles of any sort, the object of the invention being to provide a tire which will sustain the necessary wear, and which will be resilient and shock absorbing in its nature.

A further object is to provide an improved arrangement of parts which give to the tire the necessary resiliency without the employment of air or other fluid under pressure so as to overcome the trouble and annoyance as well as expense of punctured tires.

A further object is to provide a tire of the character stated which is adapted to take the place of pneumatic and cushion tires of all sorts, and which may be made in relative sizes and proportions to suit the conditions.

With these and other objects in view, the invention consists in certain novel features of construction and combinations and arrangements of parts, as will be more fully hereinafter described and pointed out in the claims.

In the accompanying drawings: Figure 1 is a view in side elevation, partly in section illustrating my improvements. Fig. 2 is a view in transverse section on an enlarged scale on the line 2—2 of Fig. 1.

1 represents a wheel having the felly 2 with openings 3 therein for the reception of bolts 4 to secure my improved clamping rings 5 to opposite sides of the felly. Nuts 6 are screwed onto the bolts 4 and may be removed to allow the tire to be removed as occasion may require. The clamping rings 5 constitute a clencher rim which engages an annular member 7. This member 7, I term a "shock absorbing member" because it is of general arch shape in cross section, and is of hard rubber or similar material which embodies strength, and at the same time has an elasticity and resiliency which enables it to move and compensate for various contortions of the tire. The member 7 is provided with grooves 8 in its opposite sides for the reception of the inwardly projecting flanges 9 on the clamping rings 5, so that the latter serve to effectually bind the member 7 to the felly.

As above stated, the member 7 is of general arch shape in cross section with its side edges curved outwardly and then inwardly constituting annular flanges 10, which on their inner faces, are recessed as shown at 11 for the reception of a resilient sustaining member 12. This member 12 constitutes an annular ring of soft rubber or other similar material with its side edges fitting in the recesses 11 and secured to the member 7.

I have illustrated rivets 13 as securing means between the members 7 and 12, but it is to be understood that other forms of securing means or additional securing means may be employed without departing from my invention.

The flanges 10 are secured by bolts 14 to the edges of a tire tread 15. This tread 15 is of metal or similar material, is of general U-shape in cross section with the side portions flared outwardly, and may or may not have an outer covering surface 16 as preferred. This covering surface may constitute a tread of rubber, fiber, canvas, cork, or combination of various materials to which my invention is not limited. While the tread 15 is of steel and sufficiently flexible and resilient to compensate for excessive and varying loads, it has no appreciable lateral flexibility or resiliency. In other words, it is not intended that the tread portion 15 should flatten out, but should always maintain its general U-shape as indicated in Fig. 2, the resiliency and cushioning qualities of the tire being supplied by the members 7 and 12.

The member 12 is provided on its inner and outer faces, and centrally of its side edges, with longitudinal enlargements 17 and 18 respectively, and the member 7 has a central longitudinal enlargement 19. These enlargements are normally apart, but when the tire receives a great shock, they will be brought together and sustain the load, preventing a tearing apart of the members of the tire.

The bolts 14 are secured in place by means of nuts 20, so that the several parts of the tire may be separated as occasion may require.

In operation, the resilient member 12, preferably of soft rubber, is caused to expand transversely as the tire is compressed, and the member 7 is of such a material as to tend to resist the resiliency of the member 12, so that it operates as a shock absorber, hence while the tire is rendered sensitive and extremely resilient to cushion the load, the member 7 absorbs shocks and prevents rebound, so that the tire rides easily without an excess of spring motion.

The member 12 is entirely inclosed, so that it is protected from weather conditions, and hence it will retain its resiliency for an indefinite length of time.

For convenience of description, I have referred to the part 7 as a "yielding member", the part 12 as a "resilient member", and the part 15 as a "tread". As a matter of fact they all constitute a part of my improved tire, and while the member 15 is as a matter of fact, the tire per se, to distinguish it from the other portions of the tire, I have called it the tread and will utilize these terms in the claims.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A tire comprising a yielding shock absorbing member of general arch shape in cross section, a tread secured at its edges to the edges of said member, and a resilient member connecting the ends of the arch shaped members and interposed between said arch shaped member and the tread, substantially as described.

2. A tire comprising a yielding shock absorbing member of general arch shape in cross section, a tread secured at its edges to the edges of said member, and a resilient member secured at its edges to the first-mentioned member and exerting a sustaining action upon the said member, substantially as described.

3. A tire comprising a yielding member of general arch shape in cross section, a resilient member connecting the edges of the arch shape member, and a tread of general U-shape secured at its edges to the arch shape member and inclosing the resilient member, substantially as described.

4. A tire comprising a yielding member of general arch shape with its edges curved outwardly, and a U-shaped tread having its edges secured to the outwardly curved edges of the said member, and a resilient member secured to the outwardly curved portions of the first-mentioned member and inclosed within the tread, substantially as described.

5. The combination with a wheel felly, an annular yielding member fitting around the wheel felly and of general arch shape in cross section, said member having grooves in its opposite faces, clamping devices secured to the felly and projecting into said grooves, a tread secured at its outer edges to the outer edges of said member, and a resilient annular member secured at its edges to the outer portions of the first-mentioned member and inclosed within the tread, substantially as described.

6. The combination with a wheel felly, an annular yielding member fitting around the wheel felly and of general arch shape in cross section, said member having grooves in its opposite faces, clamping devices secured to the felly and projecting into said grooves, a tread secured at its outer edges to the outer edges of said member, a resilient annular member secured at its edges to the outer portions of the first-mentioned member and inclosed within the tread, said resilient member having longitudinal enlargements on its inner and outer faces, and said first-mentioned member having a central longitudinal enlargement coöperating with the enlargements on the resilient member to sustain extreme jars, substantially as described.

In testimony whereof I have signed my name to this specification in the presence of two subscribing witnesses.

WILLIAM J. SPENCER.

Witnesses:
H. A. SCHMID,
EMMA D. DIETZE.